Inventors
Harold R. Scibbe
George V. B. Hall
James A. Hilgendorf

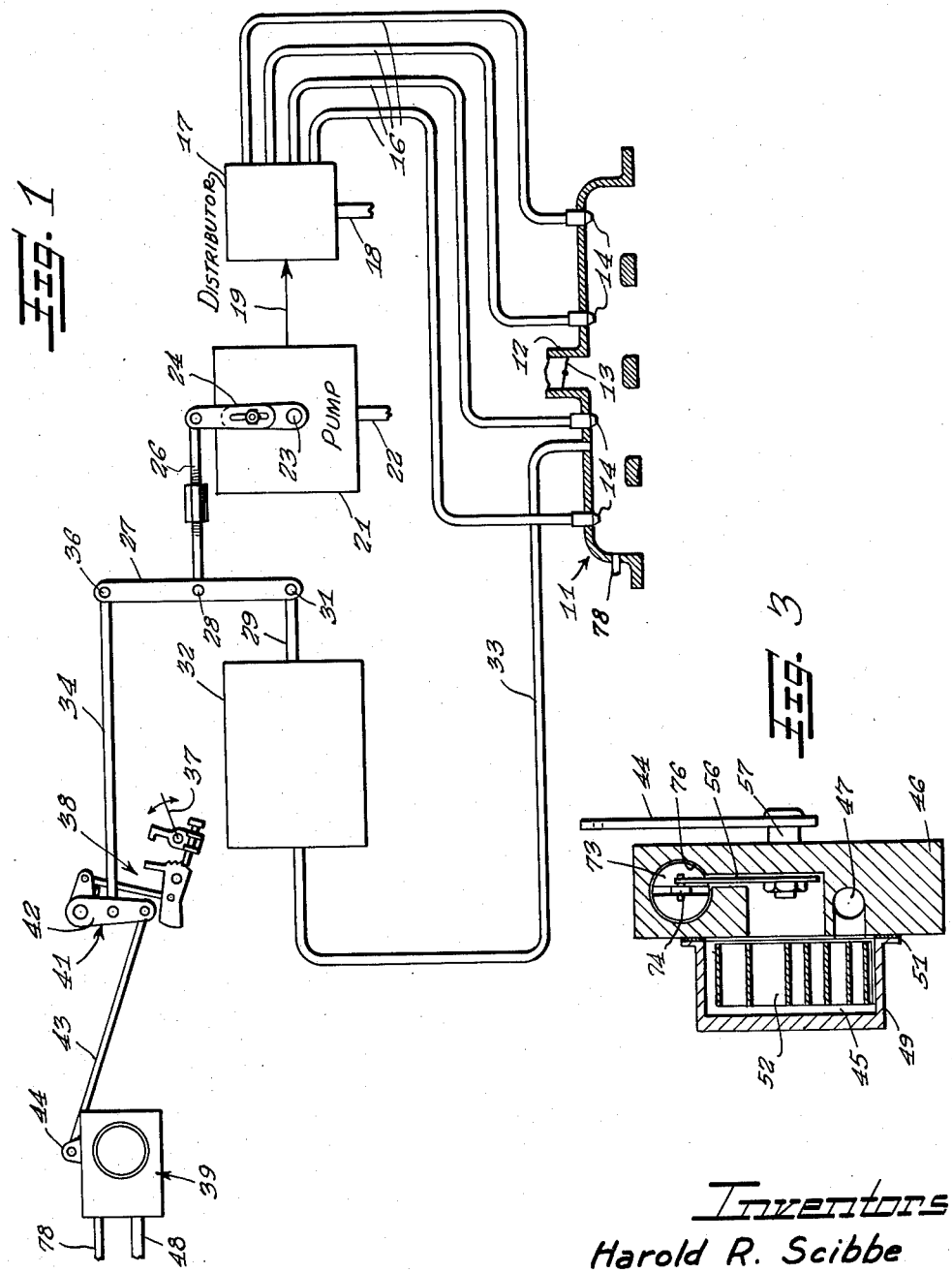

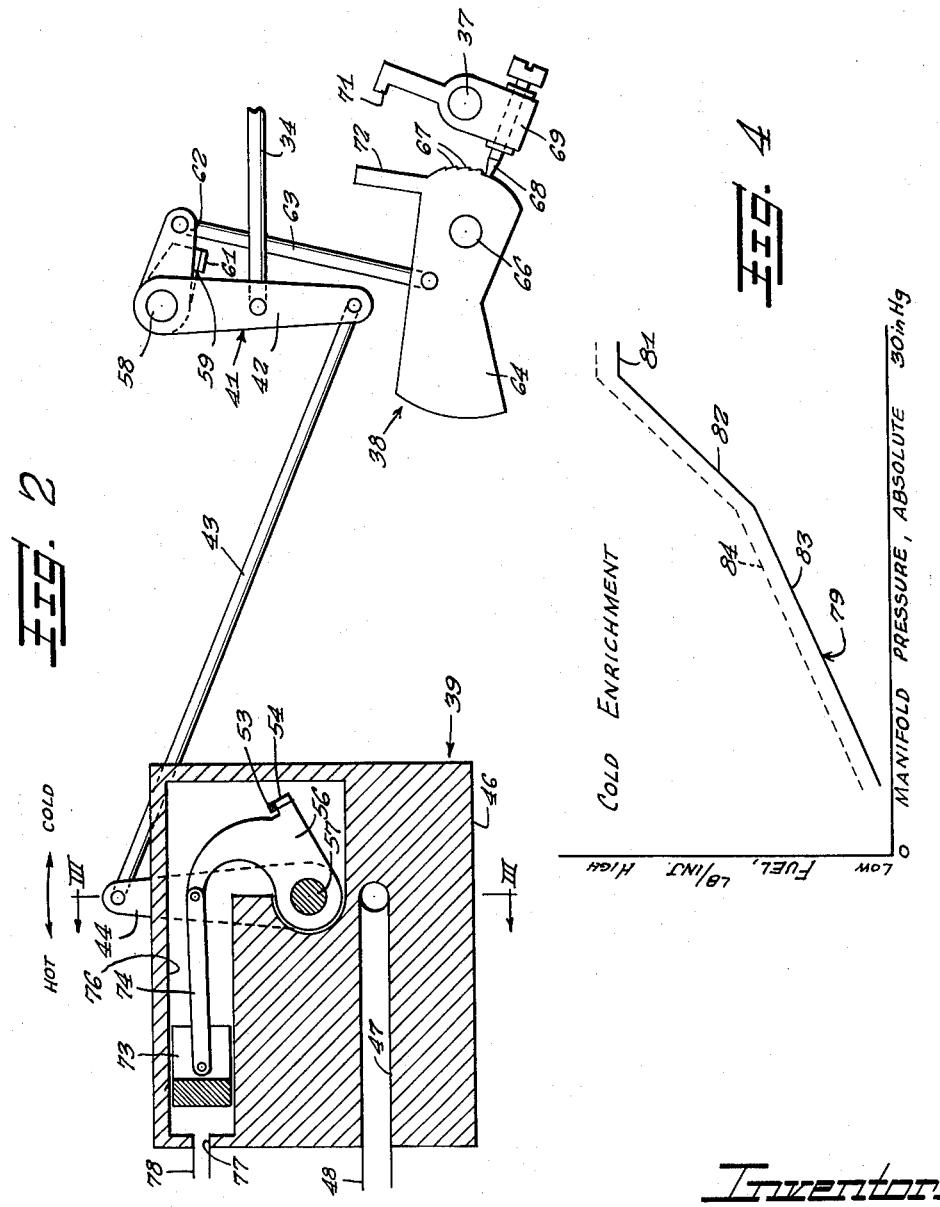

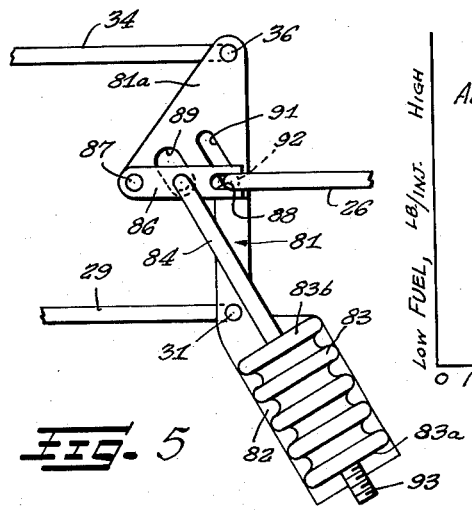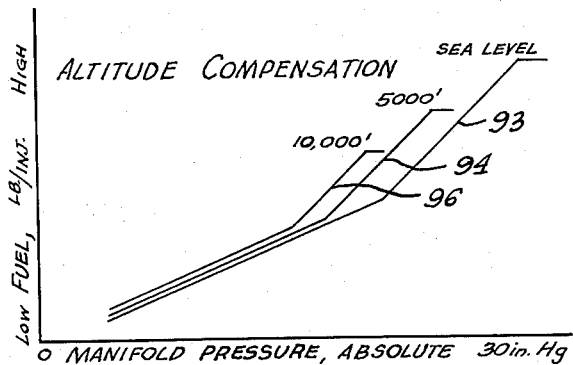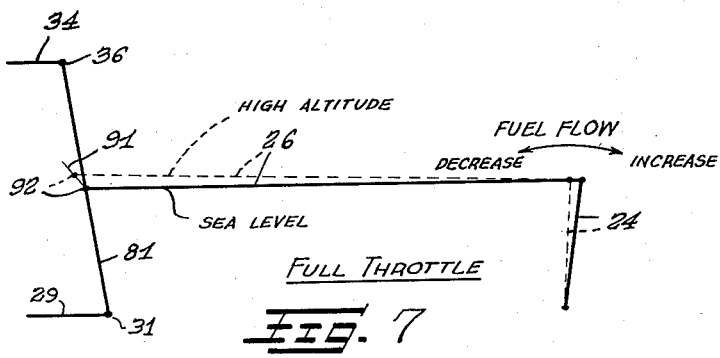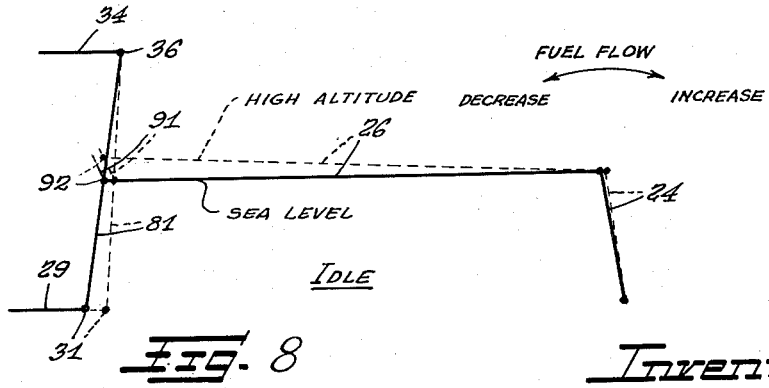

United States Patent Office 3,003,489
Patented Oct. 10, 1961

3,003,489
FUEL INJECTION PUMP CONTROL
Harold R. Scibbe, Chardon, George V. B. Hall, Euclid, and James A. Hilgendorf, Cleveland, Ohio, assignors to Thompson Ramo Wooldridge Inc., Cleveland, Ohio, a corporation of Ohio
Filed Apr. 9, 1959, Ser. No. 805,242
14 Claims. (Cl. 123—140)

The present invention relates to improvements in fuel supply systems for internal combustion engines and more specifically to a control mechanism for supplying the density function in a speed-density type of metering system used in automatic fuel injection systems for otto-cycle engines.

In an otto-cycle or spark ignition engine, the air-fuel mixture must support a flame front and the air-fuel mixture is important to proper operation of the engine. Fuel supply systems have used mass density air flow measuring systems wherein the quantity of air flowing into the intake manifold of the engine is measured by providing a venturi and measuring the mass of air flowing into the manifold by the pressure in the venturi throat. Speed-density systems measure the quantity of air intake by measuring the engine speed and obtain and are well adapted to use with a fuel injection type of fuel supply to the engine since the speed measurement can be supplied directly to control fuel supply by controlling the speed of the fuel pump as a function of engine speed. Speed density systems are advantageous in that they supply strong signals and offer simplicity and low cost.

The density signal is obtained by measuring the vacuum pressure in the intake manifold. The present invention contemplates the provision of an improved mechanism for supplying a control signal which is a function of intake manifold pressure to a fuel supply device such as a variable displacement pump.

Under certain circumstances of engine operation and operating conditions, for optimum performance, and efficiency, the relationship between the intake manifold pressure and quantity of fuel delivered to the engine must be varied. The present invention also contemplates the provision of mechanism which will compensate for varying engine conditions and conditions of operation and will supply a modulating or correcting signal to the fuel supply device for obtaining optimum fuel supply for the engine.

An object of the invention is to provide a mechanism which will supply a density signal to a speed density controlled fuel injection system which will compensate for reductions in air density at increasing altitudes.

Another object of the invention is to provide a mechanism for supplying a density signal in a speed-density controlled fuel system which will automatically compensate for improved air pumping of the engine at higher altitudes because of reduced back pressure and modulate the density signal from the intake manifold.

A further object of the invention is to provide an improved density control mechanism for fuel supply systems wherein a mechanism operates to compensate for reduction in air density at high altitudes by reducing fuel supply at full open throttle operation while biasing part-throttle fuel flow as desired.

Another object of the invention is to provide a speed-density controlled fuel injection system in which a compensation is automatically made in the density signal for increased fuel supply during periods when the engine is cold, and also for further increasing fuel supply during cranking of a cold engine.

Another object of the invention is to provide an improved speed-density controlled fuel injection system having a throttle valve for the intake manifold in which the throttle is held open during the warming of the engine by mechanism provided for modulating the density signal to increase fuel supply to a cold engine.

Another object of the invention is to provide an improved speed-density controlled fuel injection system provided with compensating means to change the density signal to increase fuel supply to the engine during cold starting and provided with means to nullify the effect of the compensating means to start a flooded engine.

A still further object of the invention is to provide an improved vacuum motor for supplying a displacement signal as a function of intake manifold pressure in an engine wherein the relationship between the displacement signal and manifold pressure change is different for a power range of throttle opening, a cruising range of throttle opening, and an idle range with closed throttle, wherein the power range and the idle range may be adjustably varied, and wherein a maximum uniform signal is provided for a small range of manifold pressures at full open throttle position.

Another object of the invention is to provide a mechanism for producing a density signal for a fuel supply system and which is a function of intake manifold pressure and wherein a compensating signal may be provided at idle speeds when air intake is a non-linear function of speed.

Other objects and advantages will become more apparent with the teaching of the principles of the invention in the disclosure of the preferred embodiments thereof in the specification, claims and drawings, in which:

FIGURE 1 is a schematic showing of a fuel injection system for a combustion engine having a speed-density control for metering the fuel to the engine, and embodying the principles of the present invention;

FIGURE 2 is an elevational view with portions shown in section of mechanism provided to modify the density signal of the control for starting and for cold engine operation;

FIGURE 3 is a vertical sectional view taken substantially along line III—III of FIGURE 2;

FIGURE 4 is a graph illustrating the curve of the quantity of fuel metered to the engine as a function of absolute manifold pressure and the effect of the cold engine operation control mechanism;

FIGURE 5 is a detailed elevational view of the mechanism provided to modify the density signal for the fuel control for variations in barometric pressures;

FIGURE 6 is a graph showing the curve of fuel supply to the engine plotted as a function of absolute manifold pressure and showing the effect of the barometric pressure control mechanism at different altitudes;

FIGURE 7 is a diagrammatic illustration of the density signal control linkage showing the effect of the barometric pressure mechanism on the linkage at full throttle or full power operation of the engine;

FIGURE 8 is a diagrammatic showing similar to FIGURE 7 and illustrating the effects of the barometric pressure compensating mechanism at idle operation of the engine;

As shown on the drawings:

Figure 9:
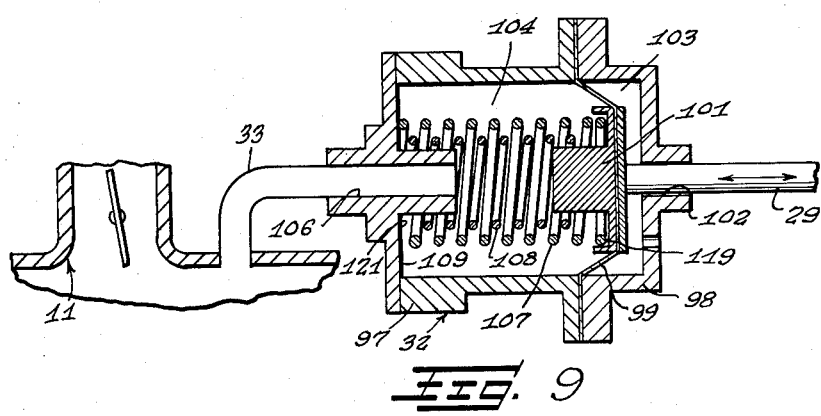
FIGURE 9 is a vertical sectional view taken through the center of the vacuum motor mechanism which converts the vacuum pressure signal into a displacement force.

An otto-cycle internal combustion engine is provided with an intake manifold 11, as illustrated in FIGURE 1. The manifold 11 is provided with an air intake passage 12, in which is located a pivotal throttle valve 13. The throttle valve is positioned either by an operator, or through suitable mechanism to operate the engine at a desired speed, and to increase or decrease air supply to the engine to meet different load conditions. Adjustment of the throttle valve will send an air density signal to the fuel supply system, increasing or decreasing the rate at which fuel is metered to the engine, and thereby controlling the air-fuel ratio. The control system of the pressure embodiment is a speed-density type control, and the amount of fuel metered to the engine is automatically controlled in accordance with signals which are a function of the speed of operation of the engine, and of the density of air in the intake manifold. Compensations are made for engine operating conditions which require a change in the air-fuel mixture for either a more lean or more rich mixture by modulating or compensating the density signal which is transmitted to the fuel supply mechanism.

The fuel is supplied through the intake manifold through individual injectors 14 which are illustrated in the form of injectors provided for each cylinder of the engine. Fuel conduits 16 connect to a distributor 17 which releases fuel at appropriate times to the individual injectors. The distributor is driven by a drive shaft 18 which is connected to the engine so as to be driven in synchronism therewith.

Fuel is metered by a variable displacement pump 21 which connects through a line 19 to the distributor. The pump is preferably of the positive displacement type and is driven by a drive shaft 22 connected to the engine so that the pump output is a linear function of engine speed. The pump thus obtains its speed signal. The density signal is supplied to the pump through a rotating shaft 23 and its rotary position is controlled by a crank arm 24 which is operated by a pivotally connected reciprocating rod 26. The arm 24 and the rod 26 may be adjustable in length.

The rod 26 is pivotally connected at 28 to a pivotal rocker arm 27. The pivotal arm 27 receives an air density signal from a vacuum motor 32 which has a piston rod 29 connected to the pivotal arm at 31. The vacuum motor 32 is connected by an air conduit 33 to the intake manifold 11.

The pivotal arm 27 receives a compensating signal for cold engine starting and running through a rod 34 which is pivotally connected at 36 to the pivotal arm 27. The arm 34 is pivotally connected to an arm 42 of a bell crank 41 which is rocked by a rod 43. The bell crank 41 also operates fast idle mechanism 38. The rod 43 is connected to an arm 44 which is operated by cold start and run mechanism 39.

The cold start and run mechanism 39 and the fast idle mechanism 38 are shown in detail in FIGURE 2. This mechanism performs two functions for cold engine operation, i.e., enrichment and fast idle. The cold engine compensator, shown generally at 39, includes a body or housing 46. Within the body 46 is an inlet passage 47, and a conduit 48 connects to a source of engine heat, such as the exhaust manifold of the engine. The passage 47 connects to a heat chamber 45 within a cap 49 (FIGURE 3) secured to the body 46. The heated air from the manifold circulates over a thermo-sensitive element 52 before passing through a heat dam 51. The thermo-sensitive element may take various forms, as will be appreciated by those skilled in the art, with one end anchored, and another end 53 in engagement with a lateral extension 54 of a control link 56. The control link is mounted on a pivotal shaft 57 which also carries the arm 44 to transmit pivotal movements of the control link 56 to the rod 43.

The thermo-sensitive element 52 tends to force the control link 56 to rotate the arm 44 in the direction marked "cold" in FIGURE 2. This force is transmitted to the rod 43 and to the bell crank arm 42 which in turn reciprocates the rod 34 leading to the pivot link 27, as illustrated in FIGURE 1.

The bell crank 41 is mounted on a pivotal shaft 58 and an upper arm 59 of the bell crank is secured to the shaft. The upper arm has a lateral extension 61 which extends beneath an arm 62 freely pivotal on the shaft 58. The extension 61 thus transmits counter-clockwise movement of the bell crank 41 to the arm 62, to lift a rod 63 which is connected to a cam 64 of the fast idle mechanism 38. The cam 64 is pivoted on a shaft 66 and has a cam surface 67 which may be stepped and which provide a stop for a set screw 68 connected to a fast idle arm 69. The fast idle arm is connected to the shaft 37 which is mechanically linked to the throttle, so as to hold it open when the set screw 68 engages the cam surfaces 67. The surfaces 67 may be stepped so that the throttle will be held open an amount in accordance with the engine temperature. The set screw will be frictionally held against the cam surfaces 67, and while the engine warms up, the extension 61 will permit the bell crank 41 to pivot in a clock-wise direction, FIGURE 2, and the throttle valve will be closed only after the operator pivots the fast idle arm 69 in a counter-clockwise direction to release the cam 64, which pivots due to its off-center weight distribution.

The fast idle arm 69 is provided with an upper extension 71 which is positioned to engage a projection 72 on the fast idle cam. This permits the operator to cut out the compensating signal of the cold running mechanism when the engine is flooded. By moving the throttle to full open position, the extension 71 will engage the projection 72 to pivot the cam 64 in a counter-clockwise direction and pivot the bell crank 41 and the link 56 against the action of the thermo-sensitive element, so as to draw the rod 34 to the left, in FIGURE 2, to the position which it would occupy when the engine is warm.

A mechanism is provided to apply a force after the engine has started to cut out starting compensation. For this purpose, the link 56 is connected to a piston 73 by a connecting link 74. The piston is loosely fitted in a chamber 76 through which gas flows from the passage 47. The gas flows out through a port 77 which is connected to a conduit 78 leading to the intake manifold. This permits a flow of exhaust heated air, which is indicative of engine temperature, to flow over the spiral bi-metallic thermo-sensitive element 52, and past the piston. The vacuum load on the piston increases, as soon as the engine is started, to move the link 56 in a counter-clockwise direction and reduce the compensating signal sent through the rod 34 to the pivot link 27. This provides an extremely rich mixture for priming (cranking and starting) and a moderately rich mixture is immediately available for cold running, and no separate priming device as necessitated. As the cold engine compensator is warmed up, the linkage is permitted to move toward the hot position. The freely movable bell crank 41 permits the engine to return to its basic fuel requirements as it warms up, even though the engine is untended and the fast idle throttle arm 69 continues to be held by the cam 64. The weight of the fast idle cam 64 will permit gravity to pull it to normal operating position as the engine warms up when not engaged by the set screw 68.

As may be observed in FIGURE 1, the cold enrichment compensating signal is delivered to the pivotal link 27, and this delivers a reciprocating motion to the rod 26 to modulate the position of the link as controlled by the vacuum motor 32. This, of course, results in a richer mixture than would be metered to the engine in accordance with the density signal provided by the vacuum motor 32.

In FIGURE 4, the curve 79 illustrates the relationship between the quantity of fuel metered, and the absolute manifold pressure under normal warm engine conditions. The curve illustrates a full throttle portion 81, a power portion 82, and a cruising range operation 83. The curve 84 illustrates a fuel delivery when the density signal to the fuel metering mechanism is modulated by the cold enrichment mechanism. As the engine warms up, the fuel delivery curve will modulate toward the position of the curve 79 until the engine is at normal operating temperature. Thus, an additional amount of fuel is supplied to the engine at all manifold pressures, to compensate for cold engine conditions. Instantaneous enrichment is available for acceleration during engine warm up due to decreased vacuum load on the spiral bi-metallic element 52.

As the engine is operated at different altitudes, and at different barometric pressures, compensation in the density signal may be made with the mechanism illustrated in detail in FIGURE 5. The pivotal dual input link 27, shown in FIGURE 1, is modified and replaced by a link 81, as illustrated in FIGURE 5. The dual input link 81 is provided with a support extension portion 82 to carry a sealed bellows 83. The bellows is of the expansible type, which is anchored at its lower end 83a and has a movable upper end 83b connected to a compensator link 84. The compensator link is connected to a barometric compensator arm 86 which is pivotally mounted on a pin 87 mounted on a broad upper portion 81a of the pivotal link 81. The compensator arm 86 has a forked holding end 88 which extends over the reciprocating rod 26 to shift its position as the arm 86 is pivoted. A slot 89 is formed in the upper portion 81a of the link 81, to permit the link 84 to be connected to the arm 86 and to permit the arm to pivot.

The end of the rod 26 is turned at right angles to extend through the slot provided by the forked end 88 of the arm 86 and to extend in a slot 91 in the upper portion 81a of the link 81. Thus, expansion and contraction of the bellows will pivot the arm 86 and determine the position of the end 92 of the rod 26 in the slot 91. This, of course, determines the pivotal point of connection between the rod 26 and the link 81.

The slope of the slot 91 in the dual input link 81 is dependent upon the characteristics of the engine in which the control is to be installed. An adjusting screw 93 is provided between the sealed bellows 83 and the bracket 82 on the link 81 on which the bellows is mounted, to aid in calibrating the system.

As the sealed bellows 83 expands and the barometric compensator arm 86 pivots upwardly, the position of the pivot point of the end 92 of the rod 26 is caused to move up along the slot 91. The effect of this change in pivot point location on the linkage movement is illustrated in FIGURES 7 and 8.

For purposes of illustration in connection with FIGURES 7 and 8, the pivot point 36, which shifts with movement of the rod 34, may be considered as being fixed. The relative position of the connected mechanical links, with change in barometric pressure, is illustrated in FIGURE 7 at full power or full throttle position of the engine. Inasmuch as the throttle is fully open, the vacuum motor will not operate the rod 29 when the engine changes from sea level operation to high altitude operation, since the intake manifold vacuum will not change any appreciable amount. In FIGURE 7, the position of the linkage at sea level is shown by the solid lines, and the position of the linkage at a high altitude is shown by the dotted lines. It is to be noted that the arm 24 will be moved in a direction to decrease the fuel supply to the engine when the arm 86 (FIGURE 5) swings upwardly by operation of the bellows so as to slide the pivotal location 92 upwardly in the slot. This, of course, automatically compensates for the reduction in air density due to increase in altitude and the reduction is a function of the decrease in barometric pressure.

In FIGURE 8, the solid lines indicate the positions of the linkage at sea level, and the dotted lines indicate the position of the linkage at a high altitude. This figure illustrates the position of the linkage at engine idling conditions, or at closed throttle. Therefore, the vacuum motor will shift the rod 29 to shift the position of the pivot point 31, and consequently, shift the pivot link 81, when the altitude changes. As the pivotal connecting point 92 is shifted along the slot 91 with increase in altitude of the engine from sea level to a high altitude, the net effect on the arm 24 is to shift it in a clockwise direction for an increase in fuel flow. This automatically compensates for greater air pumping efficiency of the engine at idling speeds at high altitudes due to reduced back pressure.

The fuel flow at idle condition for increased altitude is not reduced as it is for open throttle conditions. At sea level, an engine idles at approximately twenty inches of mercury vacuum. This corresponds to an absolute pressure of approximately ten inches mercury. An engine will also idle at approximately ten inches of mercury absolute, at reduced atmospheric pressure. If atmospheric pressure decays to twenty inches of mercury at high altitudes, and the intake manifold vacuum is only ten inches of mercury this will obtain an absolute pressure of ten inches of mercury. Engine air consumption is a function of absolute pressure, and therefore, approximately the same fuel flow requirement exists at idle, regardless of altitude or barometric pressure. FIGURE 6 illustrates the effect of the barometric or altitude compensator on the basic metering curve 93 at two arbitrarily chosen points, 5,000 ft., as illustrated by curve 94, and 10,000 ft., as illustrated by curve 96. It will be appreciated by those skilled in the art that the compensation is infinitely variable within, and beyond, the altitude range shown, and that the curves 94 and 96 are shown for illustration only.

As illustrated in FIGURE 9, the vacuum motor 32 has a hollow, generally cylindrically shaped body portion 97, provided with a cap 98 which is suitably secured thereto. A flexible diaphragm 99 extends across the body portion, being clamped between the cap and the body portion. Clamped to a central portion of the diaphragm, and axially reciprocatable within the vacuum motor is a piston 101, which is suitably secured to the rod 29. The cap is provided with a flanged opening 102 for supportably guiding the rod 29. The diaphragm 99 divides the interior of the body 97 into a chamber 103 which is exposed to atmosphere and a vacuum chamber 104. The vacuum chamber is subjected to the pressure of the intake manifold of the engine and for this purpose, the body is provided with a port 106 which is connected to the conduit 33 leading to the intake manifold 11.

The resultant pressure differential across the diaphragm 99 is measured as a force, since force equals pressure times area, and this force is balanced by an outer coil compression spring 107 which is the power range spring, and an inner coiled coaxial compression spring 108, which is the cruising range spring. These springs seat on a base surface 109, within the vacuum chamber 104.

Figure 11:
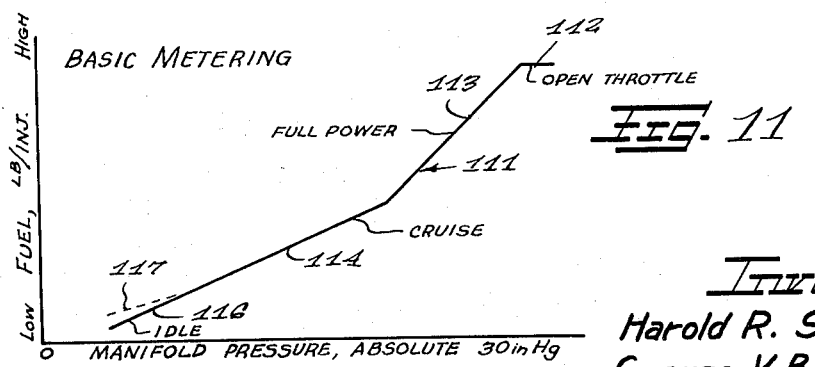

The position of the output shaft or rod 29 is transmitted to the pivotal link 27, as discussed in connection with FIGURE 1, or to the link 81, as discussed in connection with FIGURES 6, 7 and 8, and provides a fuel delivery rate curve, as illustrated in FIGURE 11.

FIGURE 11 illustrates a basic metering curve 111, having a full throttle range of delivery in the curve portion 112, a power range of delivery in the curve portion 113, a cruising range of delivery in the curve portion 114, and an idle range of delivery in the curve portion 116. The idle delivery may be altered by a modulating signal to obtain a dotted line curve portion 117, as will be explained in connection with the embodiment illustrated in FIGURE 10.

The exact shape of the basic metering curve 111 is determined by the springs 107 and 108 in the vacuum motor chamber 104. The outer spring 107 is provided with a light preload. This requires a slight depression in manifold pressure before allowing the displacement output force shaft 29 to move. This provides for the flat portion 112 of the curve at the full power open throttle position.

The transition from the full power range delivery curve 113 to the cruising range delivery curve 114 is reached by the outer spring 107 being compressed until the plunger 101 engages the inner spring 108. The combined loads of both springs 107 and 108 then govern the fuel delivery in the cruise range. Shims 119, positioned between the outer spring and the plunger 101, and shims 121 positioned between the inner spring and the base 109 of the vacuum chamber are used to adjust the load of the springs, and to compensate for variations in free length. As will be appreciated by those skilled in the art, in some circumstances, other forms of adjustment of the springs may be provided. Further, a single variable rate spring may be substituted for the two springs shown. The two spring arrangement has been found to be advantageous in numerous circumstances, and avails more flexibility in meeting the requirements of different engines.

Figure 10:
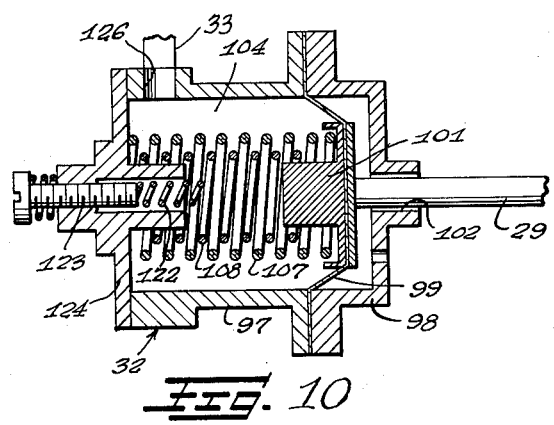
FIGURE 10 is a sectional view similar to FIGURE 9 and illustrating a modified form of the vacuum motor provided with an idle compensating mechanism; and, FIGURE 11 is a graph showing the relationship of fuel delivery to intake manifold pressure and particularly illustrating the effect of idle compensation for the vacuum motor.

FIGURE 10 illustrates a construction of a modification which obtains the idling fuel delivery curve, shown at 117 in FIGURE 11. In this construction, the vacuum motor 32 is provided with a third spring 122, coaxially centered within the springs 107 and 108, and also housed within the body 97 of the vacuum chamber. The spring is supported on an adjustment screw 123 which is threadably mounted in a base 124 of the body. The side of the body is provided with a port 126 which is connected to the conduit 33 to transmit the vacuum signal from the intake manifold to the chamber 104 within the vacuum motor.

The adjustment screw 123 provides external adjustment of the intercept point of the third spring 122 with the plunger 101. The other parts of the vacuum motor remain substantially functionally the same as described in connection with FIGURE 9.

The third spring 122 is primarily provided as an adjustable idle mixture control, but may be utilized in certain circumstances wherever low enrichment is required. The slopes of the curves 113, 114 and 117, in FIGURE 11, are dependent upon the rates of the springs 107, 108 and 122, and these springs may be replaced by a single variable rate spring in certain circumstances.

In operation, as illustrated in FIGURE 1, the fuel pump 21 is driven at a fixed multiple of the speed of the engine to deliver fuel to the distributor 17 which releases fuel to the injection nozzles 14. The displacement or output of the pump 21 is controlled by rotating a crank arm 24, which is shifted by a rod 26 connected to a pivotal link 27. The density signal for the fuel pump is obtained by a vacuum motor 32 which is connected through the conduit 33 to the intake manifold. The vacuum motor drives the output rod 29 and, as illustrated in FIGURE 10, a power range spring 107, a cruising range spring 108, and an idling range spring 122, provide the fuel metering relationship to intake manifold pressure, illustrated by the curve 111 in FIGURE 11.

A modification of the density signal is obtained by shifting the connection point 28 between the rod 26 and the pivotal link 27 in accordance with barometric pressure by providing the device of FIGURE 5. This device shifts the linkages from the solid line position to the dotted line positions of FIGURES 7 and 8, with change in barometric pressure from sea level to high altitude to decrease the metered fuel flow at full throttle high altitude operation, and to maintain the same or slightly increase the fuel supply at high altitude idle speeds, as compared with operation at sea level.

Modification of the density signal is also provided by shifting the other end of the link 27 by a cold running mechanism shown in FIGURE 2. The spiral bi-metallic thermosensitive element 52 pivots the arm 44 to shift the rod 34 to increase fuel supply at cold engine temperatures, with the engine temperature measured by drawing a flow of exhaust heated air through the body 46 of the cold engine compensator. A piston 73 decreases the enrichment supply provided at cranking of the engine, when the engine is started. The cold enrichment mechanism also operates the cam 64 to provide a stop for the fast idle arm 69 to insure fast idle during warm up periods. A projection 71 of the fast idle arm permits ineffectuating the cold engine enrichment mechanism in the event the engine becomes flooded.

Thus, it will be seen that we have provided an improved mechanism which meets the objectives and advantages hereinbefore set forth and meters fuel to an engine with a speed-density control. The mechanism provides an improved device for supplying the density signal, provides an improved mechanism for modifying the density signal with change in barometric pressure, and provides an improved mechanism for modifying the density signal for cold engine conditions. The mechanism and its combination into the overall system is simplified and extremely reliable in operation, and well suited to providing a speed-density type metering system for fuel injection for trucks and passenger cars.

We have, in the drawings and specification, presented a detailed disclosure of the preferred embodiments of our invention, and it is to be understood that we do not intend to limit the invention to the specific form disclosed, but intend to cover all modifications, changes and alternative constructions and methods falling within the scope of the principles taught by our invention.

We claim as our invention:

1. A fuel supply and control mechanism for a speed density control system for an engine comprising a fuel pump adapted for connection to deliver fuel to an engine and having a displacement output proportional to speed, means for driving the pump at a speed proportional to the speed of the engine, a control member connected to the pump to controllably vary its displacement, a distributor connected to receive fuel from the pump, fuel injection nozzles adapted for connection to an intake manifold of an engine and connected to the distributor, a pivotal link, an adjustable pivotal connection connecting the control member to the link and located at a point on the link intermediate the ends, a pressure responsive member responsive to atmospheric pressures and connected to said variable pivotal connection for varying the location of the connection of the control member to the link laterally and longitudinally of the link to reduce the fuel delivered by the pump with decrease in atmospheric pressure, a vacuum motor having an expansible chamber with a movable wall therein with said movable wall connected to one end of said link, means for connecting said vacuum motor to the intake manifold of the engine, a spring biasing means engaging said movable wall and having a first spring rate over a displacement range of the wall representative of a power range of throttle opening, a second spring rate over a displacement range of the wall representative of a cruising range of throttle opening, and a third spring rate over a range representative of idling throttle opening, means connected to the spring for adjusting the range of said third rate, a cold starting fuel enrichment member connected to the other end of said link, means responsive to engine temperatures connected to said enrichment member for moving the link to increase fuel supply during low engine temperatures, and means responsive to engine intake pressures connected to said enrichment member for moving the link to decrease fuel supply after cranking periods and when the engine is started.

2. A fuel supply control system for internal combustion engines having a variable fuel delivery device for supplying fuel to an engine, a control member adapted for connection to controllably regulate the delivery of fuel to the engine from the fuel delivery device, a signal member for applying a displacement force to actuate the control member, a pivotal link pivotally supported at one end and pivotally connected to said control member at an intermediate location along its length and pivotally connected to said signal member at the other end, said control member movable in a direction substantially normal to the position of said pivotal link, means for shifting the pivotal connection between said link and said control member both longitudinally and laterally with respect to the direction of movement of said control member to change the ratio of movement between said signal member and said control member, and a pressure responsive means responsive to change in atmospheric pressure as the control system changes altitude and encounters change in air density and connected to said shifting means so that the location of the pivotal connection to the control member changes to reduce the fuel delivery at higher altitudes.

3. A fuel control mechanism for a speed-density control system for an engine including a positive displacement fuel pump adapted for connection to deliver fuel to an engine, means for driving the pump at a speed which is a function of the speed of the engine, a control member connected to the pump to controllably vary its displacement, a pivotal link extending substantially normal to the direction of movement of the control member, a variable connection pivotally connecting the link to the control member and adjustable to vary the location of the connection relative to the link in a direction generally laterally of the path of movement of the control member, a vacuum motor connected to said link at a location displaced from said variable connection so that change in the variable connection will change the ratio between movement of the link by the vacuum motor and movement of the control member, said vacuum motor adapted for connection to an intake manifold of the engine, and means responsive to conditions of ambient air connected to said variable connection to increase fuel delivery with altitude decrease and the decrease fuel delivery with altitude increase.

4. A fuel control mechanism for a speed-density control system for an engine comprising a fuel pump adapted for connection to deliver fuel to an engine and having a displacement proportional to speed, means for driving the pump at a speed which is a function of the speed of the engine, a control member connected to the pump to controllably vary its displacement, a pivotal control link extending substantially normal to the direction of movement of the control member, a variable connection pivotally connecting the link to the control member to vary the pivotal connection in a direction parallel to the link and also in a direction parallel to the path of travel of the control member, a vacuum motor connected to one end of the link and adapted for connection to the intake manifold of the engine, a starting enrichment member connected to the other end of said link, and means responsive to the density of ambient air connected to said variable connection to increase fuel delivery with increased air density and to decrease fuel delivery with decreased air density.

5. A fuel control system for internal combustion engines having a variable fuel delivery device for delivering fuel to an engine comprising a control member adapted for connection to controllably regulate the delivery from the fuel delivery device, a signal member for applying a displacement force to actuate the control member, a pivotal link pivotally supported at one end for pivotal connection to said control member at an intermediate location along its length and pivotally connected to said signal member at the other end, said control member movable substantially normal to the link and said link moving forwardly to increase fuel delivery and backwardly to decrease fuel delivery, a pivotal connection intermediate the ends of the link connecting the control member to the link including a slotted member and a sliding member in said slot with said slot extending at an angle to the link and toward said one pivoted end of the link and at an angle to the direction of movement of the control member with the position of the sliding member in the slot determining the point of connection of the control member to the link so that the ratio of movement between the signal member and control member will be varied, and a pressure responsive means responsive to change in atmospheric pressure as the control system changes altitude and being connected to said slotted and sliding members to change the location of the sliding member in the slot and slide the sliding member toward one end of the link with decrease in atmospheric pressure to decrease the fuel delivery with atmospheric pressure decrease and to slide the sliding member toward the other end of the link with increase in atmospheric pressure to increase the fuel delivery.

6. A fuel control mechanism for a speed-density control system for an engine including a fuel pump adapted for connection to deliver fuel to an engine and having a displacement proportional to speed, means for driving the pump at a speed which is a function of the speed of the engine, a control member connected to the pump to controllably vary its displacement, a vacuum motor adapted for connection to the intake manifold of the engine for providing a displacement force as a function of pressure in the intake manifold, a variable mechanical connection between the vacuum motor and the control member operative to change the ratio of the displacement of the control member to the displacement of the vacuum motor, and a density responsive means responsive to the density of the ambient air and connected to operate said mechanical connection as a function of air density so that the displacement of the control member will provide a fuel supply which at full throttle will be decreased relative to the fuel supply at sea level and at closed throttle will be increased relative to the fuel supply at sea level.

7. A fuel control mechanism for speed-density control systems for an engine including a fuel pump adapted for connection to deliver fuel to an engine and having an output proportional to speed, means for driving the pump at a speed which is a function of the speed of the engine, a control member connected to the pump to controllably vary its output, a fuel distributor connected to receive fuel from said pump, fuel injectors for connection to the intake manifold of the engine and connected to said distributor, a vacuum motor connected to said control member and adapted for connection to the intake manifold of the engine, a starting enrichment member connected to the control member for modulating its movement and increasing the fuel supply during starting periods, a temperature responsive means connected to said enrichment member and adapted for connection to the engine to be responsive to engine temperature and increasing fuel delivery during cold engine temperatures, and pressure responsive means connected to said enrichment member and adapted for connection to engine intake pressure to increase fuel delivery during cranking periods at cold engine temperatures.

8. A fuel control mechanism for a speed-density fuel control system for an engine including a fuel pump adapted for connection to deliver fuel to an engine and having an output proportional to speed, means for driving the pump at a speed which is a function of the speed of the engine, a control member connected to the pump to controllably vary its output, a fuel distributor connected to receive fuel from said pump, fuel injectors for connection to the intake manifold of the engine and connected to said distributor, a vacuum motor connected to said control member and adapted for connection to the intake manifold of the engine, a starting enrichment member connected to the control member for modulating its movement and increasing the fuel supply during starting periods, temperature responsive means connected to said enrichment member and adapted for connection to the engine to be responsive to engine temperature and increase fuel delivery during cold engine temperatures, pressure responsive means connected to said enrichment member and adapted for connection to engine intake pressure to increase fuel delivery during cranking at cold engine temperatures, and holding means connecting to said enrichment member and positioned to hold the throttle valve of the engine open during the warm-up period for the engine.

9. A fuel control mechanism for a speed-density fuel control system for an engine including a fuel pump adapted for connection to deliver fuel to an engine and having an output proportional to speed, means for driving the pump at a speed which is a function of the speed of the engine, a control member connected to the pump to controllably vary its output, a fuel distributor connected to receive fuel from said pump, fuel injectors for connection to the intake manifold of the engine and connected to said distributor, a vacuum motor connected to said control member and adapted for connection to the intake manifold of the engine, a starting enrichment member connected to the control member for modulating its movement and increasing the fuel supply during starting periods, temperature responsive means connected to said enrichment member and adapted for connection to the engine to be responsive to the engine temperature and increase fuel delivery during cold engine temperatures, pressure responsive means connected to said enrichment member and adapted for connection to engine intake pressure to increase fuel delivery during cranking at cold engine temperatures, and cut-out means adapted for connection to the throttle of the engine and connected to move said starting enrichment member to a non-operative position at full open throttle positions to terminate enrichment at flooded engine conditions.

10. A fuel control system for internal combustion engines having a variable quantity fuel delivery device for the delivery of fuel to an engine comprising a control member adapted for connection to controllably regulate the delivery from the fuel delivery device, an expansible chamber having a movable wall, vacuum conduit means connected to the expansible chamber and adapted to be connected to the intake manifold of the engine, means connecting the movable wall to said control member, and a preloaded biasing means operatively connected to said movable wall for applying a force for balancing variable vacuum pressure forces from the intake manifold and preloaded to hold said wall stationary for maximum fuel delivery over a range of minimum vacuum pressures at full throttle position.

11. A fuel control system for internal combustion engines having a variable fuel delivery device for delivering fuel to an engine comprising a control member adapted for connection to controllably regulate the delivery from the fuel delivery device, an expansible chamber having a movable wall, vacuum conduit means connected to the expansible chamber and adapted to be connected to the intake manifold of the engine, means connecting the movable wall to said control member, a power range biasing means engaging the movable wall over a path of travel for manifold pressures representing a full range of throttle positions, said power range biasing means preloaded to hold the movable wall stationary for maximum fuel delivery over a range of minimum vacuum pressures at full throttle positions, a cruising range biasing means positioned to engage the movable wall over a path of travel representing a range of partly closed throttle openings, and means for adjusting the tension of said power range biasing means to control the range of manifold pressures over which said power range biasing means is solely operative without said cruising range biasing means and to also effect a change over said cruising range so that the relationship between fuel delivered to the engine and manifold pressure can be selectively changed over the full range of throttle positions.

12. A fuel control system for internal combustion engines having a variable fuel delivery device for delivering fuel to an engine comprising a control member adapted for connection to controllably regulate the delivery of fuel from the fuel delivery device, an expansible chamber having a movable wall, vacuum conduit means connected to the expansible chamber and adapted to be connected to the intake manifold of the engine, means connecting the movable wall to said control member, the first biasing means connected to said movable wall and balancing vacuum pressure forces representing a cruising range and a power range of throttle opening positions, said first biasing means preloaded to hold the movable wall stationary for maximum fuel delivery over a range of minimum vacuum pressures at full throttle positions, a second idle speed biasing means positioned to engage said wall at pressures representing idle speed throttle opening to vary the force-movement relationship between the control member and vacuum pressure at idle speeds, and means for adjusting the position of said idle speed biasing means relative to the chamber wall so that the manifold pressure at which said idle biasing means becomes effective can be selectively changed.

13. A fuel control system for internal combustion engines having a variable quantity fuel delivery device comprising a control member adapted for connection to controllably regulate the fuel delivery device, an expansible chamber having a movable wall, vacuum conduit means connected to the expansible chamber and adapted to be connected to the intake manifold of the engine, means connecting the movable wall to said control member, biasing means connected to said movable chamber wall and having a first spring rate over a displacement caused by vacuum pressures representative of power range throttle openings, having a second spring rate over a displacement caused by vacuum pressures representative of cruising range throttle openings smaller than said power range openings, having a third spring rate over a displacement caused by vacuum pressures representative of idle speed throttle openings, said biasing means preloaded to hold the movable wall stationary for maximum fuel delivery over a range of minimum vacuum pressures at full throttle positions, and means for adjusting the range of displacement of said third spring rate so that the manifold pressure at which said third spring rate of the biasing means becomes effective can be selectively changed.

14. A fuel control system for combustion engines having a variable quantity fuel delivery device for delivering fuel to an engine comprising a control member adapted for connection to controllably regulate the delivery from the fuel delivery device, a pressure responsive signal member adapted for connection to the intake manifold of the engine and connected to said control member to apply a displacement force as a function of intake manifold pressure to actuate the control member and regulate the fuel delivery, and means responsive to the density of ambient air and connected to the control member for applying a modulating signal which at full throttle positions of said signal member will decrease the fuel supply to the engine at higher altitudes as compared with sea level fuel supply and at closed throttle positions of said signal member will increase the fuel supply to the engine as compared with fuel supply at sea level.

References Cited in the file of this patent

UNITED STATES PATENTS

| | | |
|---|---|---|
| 2,305,070 | Butler et al. | Dec. 15, 1942 |
| 2,825,321 | Anders | Mar. 4, 1958 |
| 2,835,240 | Braun | May 20, 1958 |

FOREIGN PATENTS

| | | |
|---|---|---|
| 615,517 | Great Britain | Jan. 7, 1949 |